(12) United States Patent
Lineton et al.

(10) Patent No.: US 7,259,351 B2
(45) Date of Patent: Aug. 21, 2007

(54) HEAT TREATING ASSEMBLY AND METHOD

(75) Inventors: Warran Boyd Lineton, Ann Arbor, MI (US); Christopher Bagnall, Greensburg, PA (US)

(73) Assignee: Federal-Mogul World Wide, Inc., Southfield, MI (US)

( * ) Notice: Subject to any disclaimer, the term of this patent is extended or adjusted under 35 U.S.C. 154(b) by 0 days.

(21) Appl. No.: 10/935,546

(22) Filed: Sep. 7, 2004

(65) Prior Publication Data

US 2006/0049157 A1 Mar. 9, 2006

(51) Int. Cl.
B23K 26/00 (2006.01)
(52) U.S. Cl. ............................ 219/121.6; 219/121.68
(58) Field of Classification Search ............ 219/121.6, 219/121.85, 121.68; 228/46; 118/620; 427/457; 148/525, 565
See application file for complete search history.

(56) References Cited

U.S. PATENT DOCUMENTS

| | | | |
|---|---|---|---|
| 3,358,751 A * | 12/1967 | Berwald et al. ............ 165/185 |
| 3,480,486 A | 11/1969 | Tanaka et al. |
| 3,552,630 A * | 1/1971 | Dean .......................... 228/46 |
| 3,874,443 A * | 4/1975 | Bayer, Jr. ..................... 165/47 |
| 4,151,014 A | 4/1979 | Charschan et al. |
| 4,288,679 A * | 9/1981 | La Rocca ............. 219/121.71 |
| 4,313,771 A | 2/1982 | Lorenzo et al. |
| 4,319,707 A * | 3/1982 | Knemeyer ................... 228/46 |
| 4,401,726 A * | 8/1983 | Gnanamuthu ............... 428/610 |
| 4,405,386 A | 9/1983 | Mravic et al. |
| 4,457,360 A * | 7/1984 | Roose ....................... 165/80.3 |
| 4,502,273 A * | 3/1985 | Miyamoto et al. ............. 57/414 |
| 4,838,477 A * | 6/1989 | Roach et al. ................ 228/222 |
| 4,895,735 A | 1/1990 | Cook |
| 5,024,371 A * | 6/1991 | Unde ......................... 228/216 |
| 5,043,244 A | 8/1991 | Cairncross et al. |
| 5,330,587 A * | 7/1994 | Gavigan et al. ............. 148/212 |
| 5,375,757 A * | 12/1994 | Covill ......................... 228/46 |
| 5,478,426 A | 12/1995 | Wiler et al. |
| 5,521,628 A | 5/1996 | Montgomery |
| 5,674,415 A | 10/1997 | Leong et al. |
| 5,719,376 A * | 2/1998 | Snyder et al. ......... 219/121.85 |
| 5,741,559 A | 4/1998 | Dulaney |
| 5,942,289 A * | 8/1999 | Jackson .................... 427/398.2 |
| 6,013,140 A * | 1/2000 | Simoneaux ................. 148/320 |
| 6,075,223 A | 6/2000 | Harrison |
| 6,159,832 A | 12/2000 | Mayer |
| 6,203,633 B1 | 3/2001 | Clauer et al. |
| 6,313,436 B1 | 11/2001 | Harrison |
| 6,422,010 B1 | 7/2002 | Julien |
| 6,508,920 B1 * | 1/2003 | Ritzdorf et al. ............. 204/194 |
| 2002/0079297 A1 | 6/2002 | Harrison |
| 2003/0089761 A1 * | 5/2003 | Costa .......................... 228/245 |
| 2003/0201059 A1 * | 10/2003 | Holman et al. ............. 156/155 |
| 2004/0168752 A1 | 9/2004 | Julien |

* cited by examiner

*Primary Examiner*—Samuel M. Heinrich
(74) *Attorney, Agent, or Firm*—Robert L. Stearns; Dickinson Wright PLLC

(57) ABSTRACT

The subject invention provides a heat treating assembly. The heat treating assembly comprises a laser, a substrate, and a tool. The laser emits laser energy directed toward the substrate and the tool. The substrate absorbs the laser energy and produces heat energy within the substrate that alters the substrate. The tool is disposed in removable contact with the substrate to conduct the heat energy away from the substrate to limit the altering of the substrate. Preferably, the tool has a thermal conductivity greater than that of the substrate and is more preferably a copper material, a gold material, a silver material, or an aluminum material.

14 Claims, 3 Drawing Sheets

HEAT TREATING ASSEMBLY AND METHOD

BACKGROUND OF THE INVENTION

1. Technical Field

The subject invention relates to a heat treating assembly and a method for altering a defined area of a substrate with laser energy.

2. Related Art

Various heat treating assemblies are known to those skilled in the art that employ lasers and that use laser energy to treat a substrate. One drawback of treating the substrate with the laser is that once the laser emits the laser energy as a beam, it is difficult to restrict the energy to an area of treatment. The laser energy once absorbed by the substrate has a tendency to be conducted by the material of the substrate to regions beyond the areas directly exposed to the laser energy. This conduction makes it difficult it to precisely control the area of treatment. Known laser treatment systems also employ a relatively narrow beam of light in relation to the area to be treated in an effort to control the application of the laser energy to the desired area. Such a thin beam approach commonly requires that multiple passes (known as rastering) be made in a pattern scanning the area from side to side in lines from top to bottom. This approach is complex and costly, especially when there are multiple areas to be scanned and still does not avoid the problems associated with the controlling of the conduction of the laser energy beyond the intended target area near the boundaries.

Cross-sectional views of substrates 10, 12 that have been treated in accordance with the prior art methods are illustrated in FIGS. 1 and 2. The substrates 10, 12, after being treated with the laser, were sectioned and mounted for viewing to observe the alteration of the substrates 10, 12. Each of the substrates 10, 12 include a horizontal surface 14 and a vertical surface 16. The substrates 10, 12 were treated to harden the horizontal surface 14 while the vertical surface 16 was not to be hardened. The laser energy was focused on the horizontal surface 14, but once the substrates 10, 12 absorbed the laser energy, the heat generated was conducted from the horizontal surface 14 to the vertical surface 16. The conduction of the heat energy results in the vertical surface 16 being hardened, which may be detrimental to the usefulness of the substrates 10, 12. As shown in FIGS. 1 and 2, the treated area slopes downwardly from the horizontal surface 14 toward the vertical surface 16.

The substrate 10 in FIG. 1 may be, for example, a steel piston and the horizontal surface 14 to be hardened may be a groove on the steel piston. The vertical surface 16 of the steel piston, if repeatedly stressed, may be prone to fatigue and possible failure as a result of being heat treated and hardened from the conduction of heat beyond the desired area. Prior art FIG. 2 illustrates another example in which an iron scraper ring is provided as the substrate 12 having the horizontal surface 14 to be treated. Again, the heat energy has been conducted from the horizontal surface 14 to the vertical surface 16 and the vertical surface 16 has been detrimentally hardened. For the same reasons stated above, it is disadvantageous to have the vertical surface 16 hardened.

Yet another disadvantage of the related art methods and assemblies is that the substrate has a tendency to be distorted after it has been treated. The surface areas of the substrate have stresses such that treatment of the areas increases the stresses and the substrate can become distorted. As an example, a piston ring has stresses as a result of the shape of the piston ring. When the piston ring is treated with the related art methods and assemblies, the piston ring has a tendency to bend and become distorted.

SUMMARY OF THE INVENTION

The subject invention provides a heat treating assembly for altering a defined area of a substrate. The assembly comprises a laser operative to emit laser energy toward the exposed defined area and a tool. The tool is disposed in removable contact with the substrate adjacent the defined area. The tool has a thermal conductivity greater than that of the substrate to conduct the heat energy away from the defined area that results from the substrate absorbing the laser energy.

The subject invention also provides a method of altering the defined area of the substrate with laser energy from the laser. The method comprises providing the substrate, providing the tool, and disposing the tool in removable contact with the substrate. The tool conducts the laser energy away from the defined area and limits the altering of the substrate beyond the defined area.

Accordingly, the subject invention provides an assembly and a method that overcomes the inadequacies that characterize the related art. Specifically, the subject invention utilizes the tool to limit the altering of the substrate by conducting heat energy away from the substrate. Therefore, the heat energy precisely alters the defined area without altering additional areas of the substrate unintentionally. With reference to the related art examples described above, the subject invention ensures little or no unintentional altering of the vertical surface occurs. Only the desired area is hardened which decreases the likelihood that the substrate may fail. The tool also reduces the time and cost required to alter the desired area. The laser does not have to be precisely controlled while being scanned and the area can be treated with a single pass of a line of light-type laser. The subject invention further provides that the tool minimizes distortion of the substrate as a result of being treated.

THE DRAWINGS

These and other advantages of the present invention will be readily appreciated as the same becomes better understood by reference to the following detailed description and accompanying drawings wherein.

DETAILED DESCRIPTION OF THE INVENTION

Figure 1:
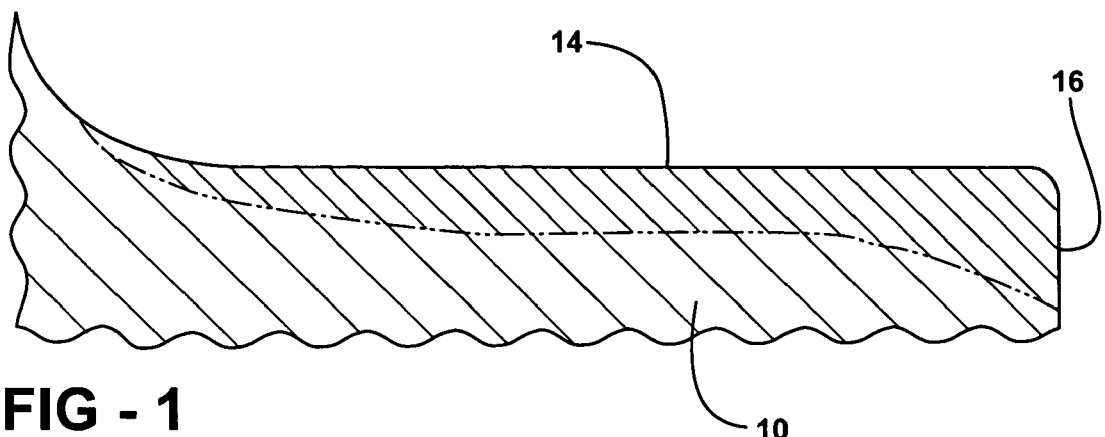
FIG. 1 is a cross-sectional view of a substrate treated using a prior art method.
Figure 2:
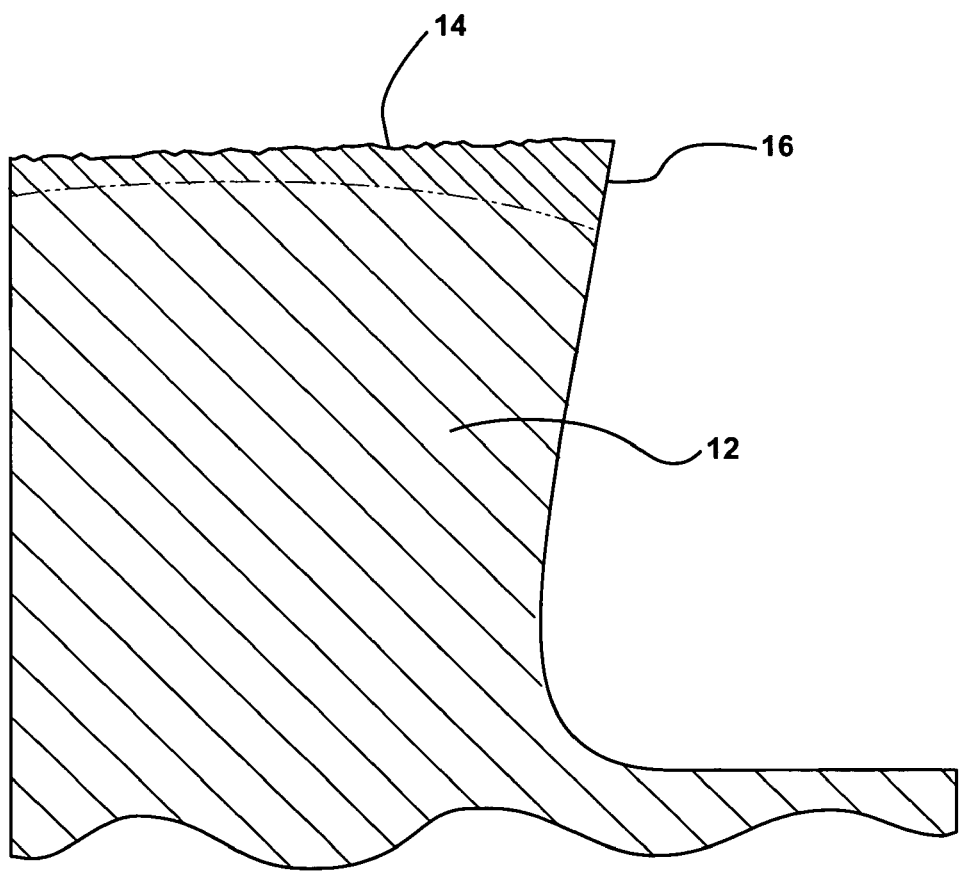
FIG. 2 is a cross-sectional view of another substrate treated using a prior art method.
Figure 3:
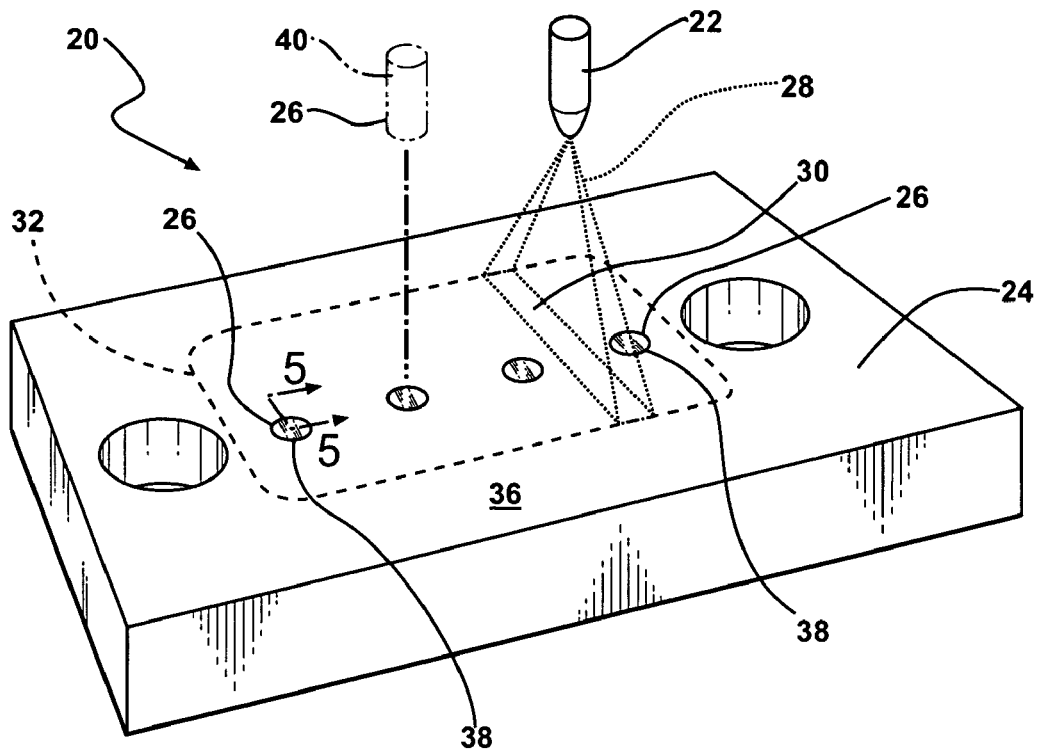
FIG. 3 is a perspective view of a heat treating assembly according to the subject invention having the tool being generally rod shaped.

A heat treating assembly is illustrated generally at 20 in FIG. 3. The heat treating assembly 20 comprises a laser 22, a substrate 24, and a tool 26. The laser 22 emits laser energy 28 directed toward the substrate 24 and the tool 26. The substrate 24 absorbs the laser energy 28 and heat energy alters the substrate 24. The substrate may be altered in various ways, such as, but not limited to, etching, marking, annealing, precipitation hardening, and the like.

Various lasers 22 emit laser energy 28 having various wavelengths depending upon the type of laser. The laser 22 may be a solid state laser, a gas laser, an excimer laser, a dye laser, or a semiconductor laser. Illustrative examples of solid state lasers include, but are not limited to, ruby-type lasers and neodymium:yttrium-aluminum garnet-type (Nd:YAG) lasers. The Nd:YAG lasers typically produce the laser energy 28 having a wavelength of about 1,064 nanometers. Illustrative examples of the gas lasers include, but are not limited to, helium-type lasers and carbon dioxide-type lasers. The carbon dioxide-type lasers typically produce laser energy 28 having a wavelength of about 10.6 microns. The Illustrative examples of excimer lasers include, but are not limited to, reactive gas- and inert gas-type lasers. Dye lasers use complex organic dyes as lasing media and may include, but are not limited to, rhodamine 6G. Semiconductor lasers include diode-type lasers. In the preferred embodiment, the laser 22 is a diode-type laser that has a power of from 500 watts to about 10 kilowatts, preferably from 500 watts to 5 kilowatts, and more preferably from 800 watts to 2 kilowatts. Diode-type lasers are commercially available from Nuvonyx and Rofin-Sinar.

The laser 22 may emit the laser energy 28 as either a beam of light (not shown) or a laser line of light 30. Those skilled in the art recognize that the beam of light is thin and narrow, whereas the line of light 30 is wider and thicker. The laser line of light 30 is able to cover a larger area when scanned relative to the beam of light, although a similar effect is achieved with a narrow beam using beam scanning optics, for example a galvo mirror. Preferably, the laser 22 emits the laser energy 28 as the laser line of light 30. The laser line of light 30 has a wavelength of from 500 nanometers to 1000 nanometers, preferably from 650 to 900 nanometers, and more preferably from 750 to 850 nanometers. The preferred diode-type laser 22 produces the laser energy 28 having a wavelength of 808 nanometers. The laser line of light 30 preferably has a width of from 0.1 millimeters to 1 millimeters and a length of from 5 millimeters to 20 millimeters. More preferably, the laser line of light 30 has a width of about ½ millimeter and a length of about 10-12 millimeters.

Figure 5:
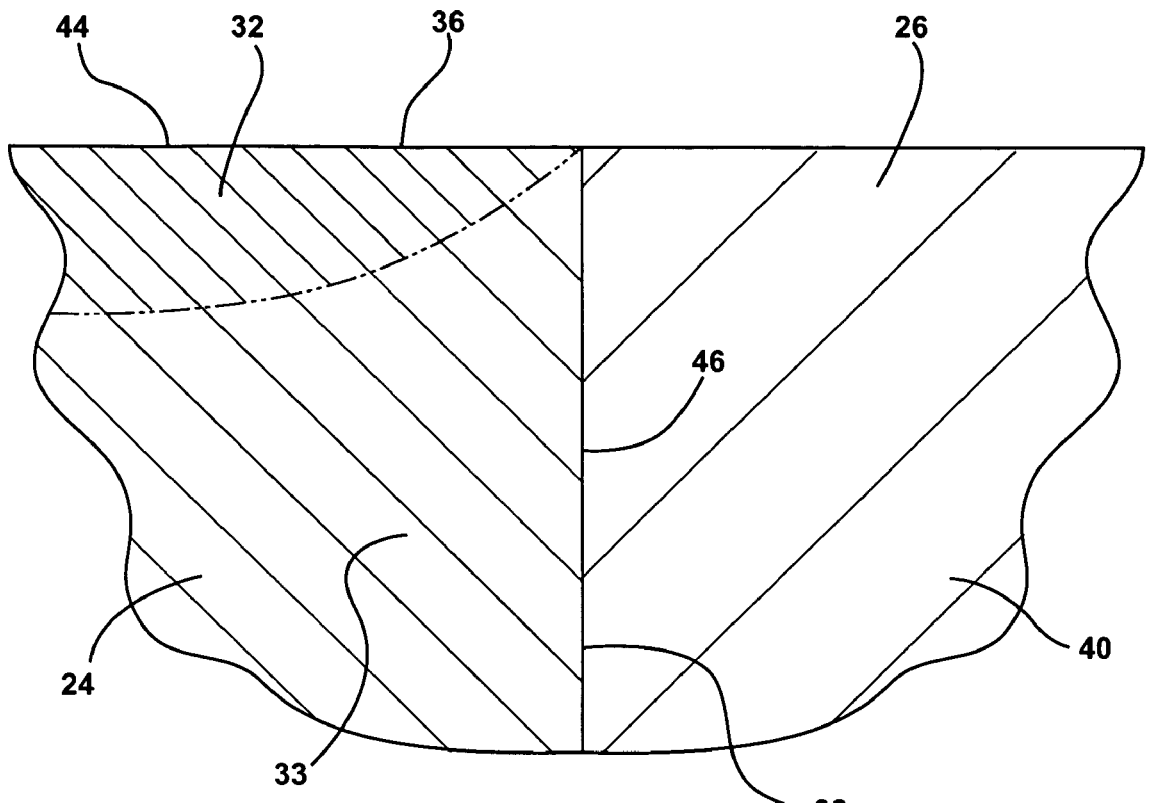
FIG. 5 is a cross-sectional view of the substrate shown in FIG. 3 having altered a horizontal surface.
Figure 6:
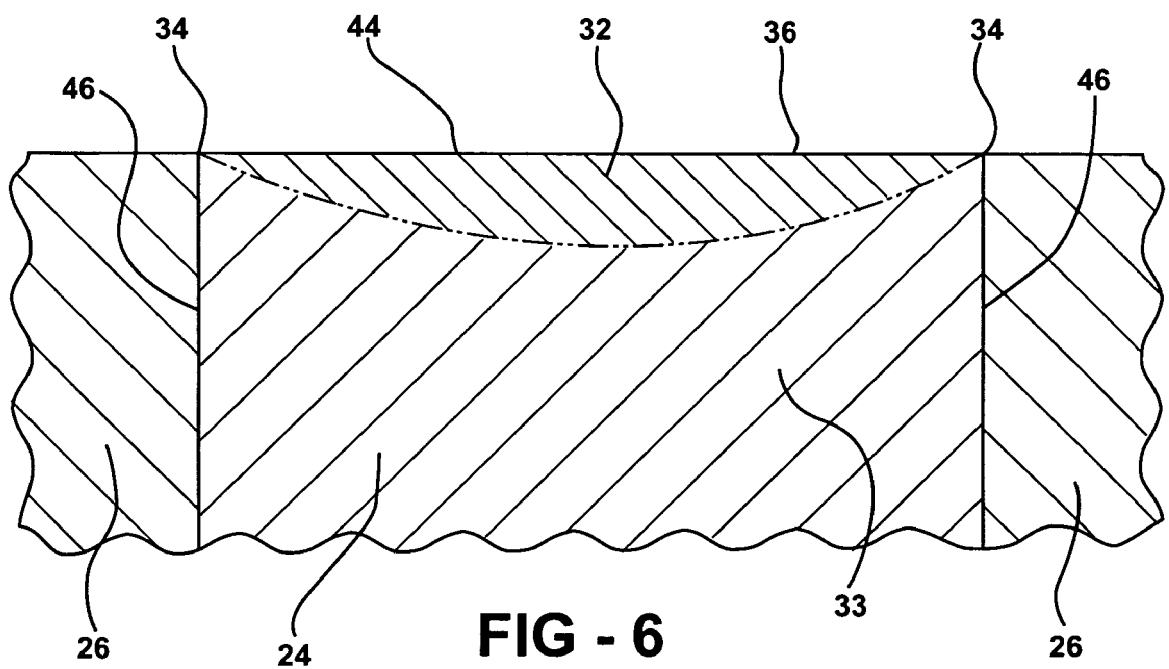
FIG. 6 is a cross-sectional view of the substrate shown in FIG. 4 having altered a horizontal surface.

The substrate 24 has a defined area 32 that is exposed to the laser energy 28 to be altered. For example, the defined area 32 may include an entire face of the substrate 24 or only a portion of the face. The defined area 32 may also include an exposed edge 34 of the substrate 24, as shown in FIG. 6. The defined area 32 may be any size and any location on the substrate; however, there is typically a corresponding area 33 adjacent the defined area 32 that is not to be altered. Preferably, the substrate 24 is formed of a material different than the tool 26. The substrate 24 may be any type of metal material that is to be altered, but the substrate 24 is preferably an iron containing material. The substrate 24 may be various shapes and sizes depending upon the application of the substrate 24. Examples of the substrate 24 include, but are not limited to, piston rings, electrodes, engine blocks, brake rotors, and the like. FIG. 3 illustrates the substrate 24 as a plate having an exterior front surface 36 and generally rectangular shaped. The front surface 36 defines a plurality of holes 38 disposed therein. FIGS. 5 and 6 illustrate the substrate 24 as a bar having the exterior front surface 36 and being generally rectangular shaped.

The tool 26 comprises at least one of a copper material, a gold material, a silver material, or an aluminum material. Preferably, the tool 26 includes the copper material or the aluminum material and most preferably includes the copper material. The tool 26 may be various shapes and sizes depending upon the application of the substrate 24. Typically, the tool 26 will be sized based upon the size of the defined area 32 and the area 33 to remain unaltered. In other words, the tool 26 may have a different shape depending upon the shape of the substrate 24, so long as the tool 26 is in removable contact at the boundary between the defined area 32 and the area 33 not to be treated.

The tool 26 has a thermal conductivity greater than that of the substrate 24. The difference in thermal conductivity allows the tool 26 to conduct the heat energy generated within the substrate 24 away from the defined area 32. Preferably, the thermal conductivity of the tool 26 is greater than 150 W/m K and more preferably greater than 200 W/m K. The copper material has a thermal conductivity of 400 W/m K and the aluminum material has a thermal conductivity of 235 W/m K.

In order for the tool 26 to effectively conduct heat energy away from the substrate 24, the tool 26 should absorb little or no laser energy 28. The tool 26 has a reflectivity greater than the substrate 24 and preferably a reflectivity of at least 65% at a wavelength of 1000 nanometers. The copper material has a reflectivity of 90% at a wavelength of 1000 nanometers and the aluminum material has a reflectivity of 71% at a wavelength of 1000 nanometers. The tool 26 preferably has an exterior surface parallel to the exterior surface of the substrate 24 to block the laser energy 28 from being absorbed by the substrate 24. The parallel surfaces of the tool 26 reflect the laser energy 28 away from the substrate 24.

In operation, the tool 26 is disposed in removable contact with the substrate 24 and adjacent the defined area 32. The laser 22 emits the laser energy 28 toward the substrate 24 and the tool 26. The laser 22 is scanned across the defined area 32. If a beam of light-type laser is employed, then the laser 22 may be repeatedly scanned across the desired area until the laser 22 has scanned the entire area, i.e., rastered. Alternatively, and preferably, if a laser line of light-type laser is employed, then the laser 22 may be scanned in a single pass and may cover not only the defined area 32, but may lap into the adjacent area 33 which is shielded by the tool 26. It is preferred that the laser line of light 30 is long enough to cover the defined area 32 in a single pass. However, the laser 22 may scan multiple passes to cover the defined area 32.

The laser energy 28 that reaches the substrate 24 is absorbed and generates heat energy in the applied regions (defined area 32) of the substrate 24. The applied laser energy 28 that laps beyond the defined area 32 into the adjacent area 33 is reflected or shielded by the overlying tool 26, and as such the adjacent area 33 is unaffected by the direct application of the laser energy 28. The substrate 24 has a pre-treated microstructure (i.e., the microstructure prior to being exposed to the laser energy 28). The heating of the defined area 32 causes a desired change in the microstructure after exposure (i.e., the defined area 32 has a post-treated microstructure that is different from the pre-treated microstructure of the remainder of the substrate 24) whereas the microstructure of the adjacent area 33 is unchanged from the initial application of the heat energy 28 to the substrate 24. As the heat energy 28 is developed in the defined area 32 as a result of the application of the heat energy, there is a natural tendency for the heat to be conducted through the substrate 24 toward the adjacent area 33, which is cooler and would serve as a low energy heat sink. However, this conduction path is interrupted by placement of the tool 26 in removable contact with the adjacent area 33. The tool 26 is selected to have a thermal conductivity greater than that of the substrate 24, and particularly the adjacent area 33, and as the heat approaches the adjacent area 33 it is drawn by the tool 26 out of the substrate 24, thereby protecting the adjacent area from alteration by the heat energy. The subject invention thus precisely controls the conduction path of the heat energy through the substrate 24 through usage of the tool 26 that, when placed in removable contact with the adjacent area 33, conducts the heat energy away from the boundary region between the defined area 32 and the adjacent area 33 thereby limiting the effects of the applied laser energy to just the defined regions 32.

Figure 4:
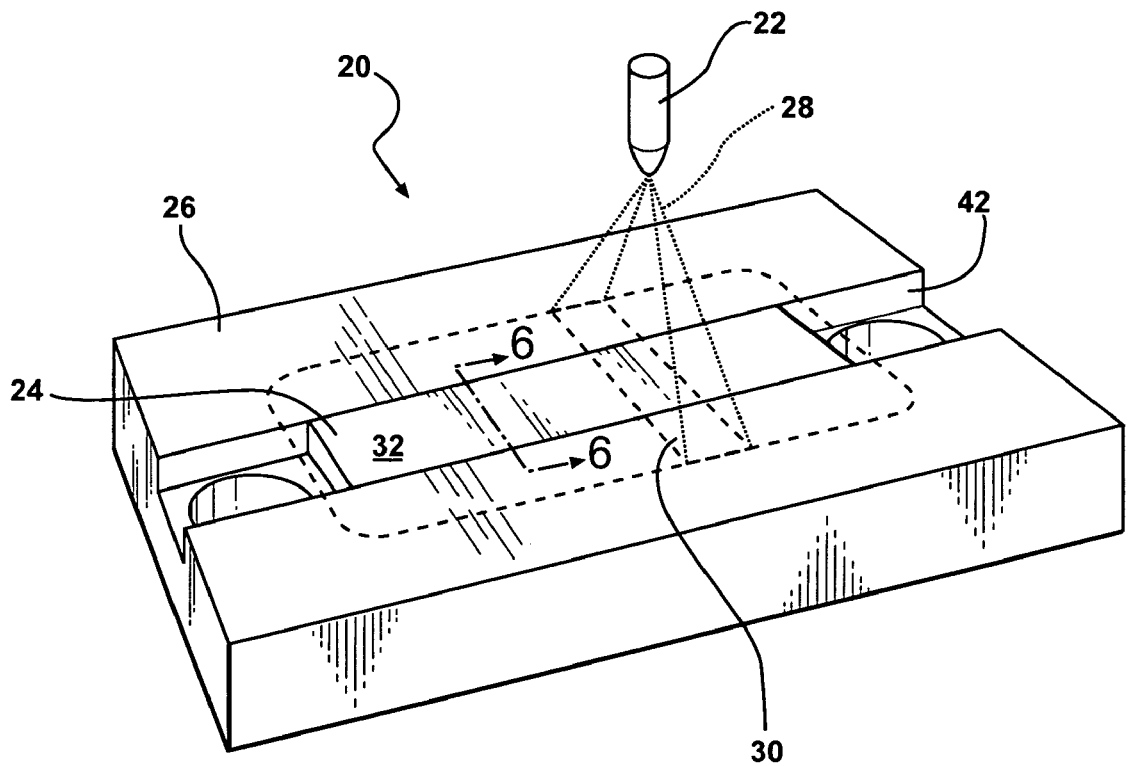
FIG. 4 is a perspective view of the heat treating assembly having the tool being generally rectangular shaped.

When the defined area 32 includes the exposed edge 34, such as surrounding the holes 38 in FIG. 3 and at the corner of the adjacent faces in FIG. 4, the tool 26 may be disposed immediately adjacent the exposed edge 34 and preferably in contact with the vertical surface 46. The relatively higher conductivity of the material of the tool 26 serves to conduct the heat energy out of the substrate and prevents heat energy build-up near the edge 34 and the vertical surface 46, protecting these regions against alteration from the heat energy.

In the embodiment shown in FIG. 3, the tool 26 includes four metal rods 40 that are removably inserted and/or embedded into the holes 38 of the substrate 24. The defined area 32 of the plate is the exterior front surface 36 of the plate. The rods 26 are disposed in direct contact with the walls of the holes 38 and act to conduct heat away from the wall surfaces of the holes 38 to shield these surfaces against alteration from the applied heat energy. The unshielded front surface 36 of the plate is heated and altered by the applied heat energy which may result in the heat-affected area 36 being hardened by the heat energy, while the unaffected regions of the holes 38 remain in their original pre-heat treated condition and thus may have a hardness less than that of the heat-affected area 36.

FIG. 5 is a cross-sectional view taken along line 5-5 in FIG. 3. FIG. 5 is an illustration of a micrograph of the substrate 24 after treatment. The substrate 24 has the defined area 32, shown as a horizontal surface 44, treated and the remainder 33 of the substrate 24 not treated. The defined area 32 has the altered microstructure while the microstructure of the remainder 33 is the same. Further, a vertical surface 46 of the substrate 24 has not been altered since the tool 26 conducts heat away from the vertical surface 46. The altered area 32 slopes upwardly toward the edge 34 and the contact between the tool 26 and the substrate 24.

In the embodiment shown in FIG. 4, the tool 26 has a slot 42 shaped to receive the rectangular bar. The defined area 32 of the bar is the exposed face of the bar, while the sides are the areas 33 not to be treated. The tool 26 conducts the heat away from the sides to limit the altering of the other faces FIG. 6 is a cross-sectional view taken along line 6-6 in FIG. 4. FIG. 6 is an illustration of a micrograph of the substrate 24 after treatment. Again, the defined area 32 is the horizontal surface 44 and the tool 26 is in contact with the vertical surfaces 46. The altered area 32 has been limited to the horizontal surface 44, while the vertical surfaces 46 have been shielded by the tool and are unaffected by the applied heat. As can be seen, the altered area curves upwardly toward the edge 34 and the contact between the substrate 24 and the tool 26.

After the laser 22 scans the substrate 24 and the tool 26, the substrate 24 and the tool 26 are separated. The substrate 24 may then be finished depending upon the particular requirements for the substrate 24. One advantage of the subject invention is that it enables lower grade alloys to be used for substrate material in place of higher grade alloys, since the regions of the substrate calling for the properties of the higher grade alloys can be developed through the targeted heat treatment of those areas, while the surrounding regions can remain unaffected. Moreover, there may be applications where a high hardness is called for in some areas of the substrate, while such a high hardness would be detrimental to areas immediately adjacent the desired high hardness areas. According to the invention, the higher hardness properties can be developed in the desired regions through targeted application of the laser heat energy, while the adjacent lower hardness regions can be protected against modification by the heat energy through shielding by the tool.

Obviously, many modifications and variations of the present invention are possible in light of the above teachings. The invention may be practiced otherwise than as specifically described within the scope of the appended claims.

What is claimed is:

1. A heat treating assembly comprising:
a laser operative to emit laser energy;
a substrate having a defined area exposed to said laser energy to alter said defined area of said substrate; and
a tool disposed in removable contact with said substrate adjacent said defined area and having a thermal conductivity greater than that of said substrate to conduct heat energy away from said defined area, wherein said tool has a reflectivity greater than said substrate.

2. An assembly as set forth in claim 1 wherein said tool has a reflectivity of at least 65% at a wavelength of 1000 nanometers.

3. A heat treating assembly comprising:
a laser operative to emit laser energy;
a substrate having a defined area exposed to said laser energy to alter said defined area of said substrate, wherein said defined area has a microstructure that is modified as a result of exposure to said laser energy and wherein said defined area includes an exposed edge; and
a tool disposed in removable contact with said substrate adjacent said defined area and having a thermal conductivity greater than that of said substrate to conduct heat energy away from said defined area, wherein said tool is disposed immediately adjacent said exposed edge to limit the altering of said microstructure to said defined area and to prevent heat energy build-up near said edge.

4. An assembly as set forth in claim 3 wherein said substrate is formed of a material different than said tool.

5. An assembly as set forth in claim 4 wherein said tool has a thermal conductivity of greater than 150 W/m K.

6. An assembly as set forth in claim 3 wherein said substrate is further defined as an iron containing material.

7. An assembly as set forth in claim 3 wherein said defined area absorbs said laser energy and produces heat energy that modifies said microstructure.

8. An assembly as set forth in claim 3 wherein said tool has an exterior surface parallel to said exterior surface to said substrate.

9. An assembly as set forth in claim 3 wherein said tool comprises at least one of a cooper material, a gold material, a silver material, or an aluminum material.

10. An assembly as set forth in claim 3 wherein said laser is further defined as a diode-type laser.

11. An assembly as set forth in claim 10 wherein said diode-type laser emits a laser line of light to produce said laser energy.

12. An assembly as set forth in claim 11 wherein said laser line of light has a wavelength of from 500 nanometers to 1000 nanometers.

13. An assembly as set forth in claim 12 wherein said laser line of light has a width of from 0.1 millimeters to 1 millimeters and a length of from 5 millimeters to 20 millimeters.

14. An assembly as set forth in claim 3 wherein said laser has a power of from 500 watts to about 10 kilowatts.

* * * * *